(12) United States Patent
Shivajirao et al.

(10) Patent No.: US 11,431,675 B2
(45) Date of Patent: Aug. 30, 2022

(54) CLIENT DEVICE BASED SOLUTION FOR HANDLING MAC RANDOMIZATION

(71) Applicant: ARRIS Enterprises LLC, Suwanee, GA (US)

(72) Inventors: Jagdeep Shivajirao, Bengaluru (IN); Muralidharan Narayanan, Bangalore (IN); Sathish Arumugam Chandrasekaran, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/399,534

(22) Filed: Aug. 11, 2021

(65) Prior Publication Data

US 2022/0052981 A1 Feb. 17, 2022

(30) Foreign Application Priority Data

Aug. 17, 2020 (IN) .............................. 202021035421

(51) Int. Cl.
*G06F 15/16* (2006.01)
*H04L 61/5092* (2022.01)
(Continued)

(52) U.S. Cl.
CPC ...... *H04L 61/5092* (2022.05); *H04L 61/3015* (2013.01); *H04L 61/4588* (2022.05); *H04L 61/5076* (2022.05); *H04L 2101/622* (2022.05)

(58) Field of Classification Search
None
See application file for complete search history.

(56) References Cited

U.S. PATENT DOCUMENTS

| 6,823,454 B1 * | 11/2004 | Hind ................... H04L 61/4511 |
| | | 713/168 |
| 6,826,690 B1 * | 11/2004 | Hind ...................... G06F 21/31 |
| | | 713/176 |

(Continued)

FOREIGN PATENT DOCUMENTS

WO WO-2017184139 A1 * 10/2017 ............. H04L 12/28

OTHER PUBLICATIONS

Jeremy Martin et al., "A Study of MAC Address Randomization in Mobile Devices and When it Fails", arxtv.org, Cornell University Library, Mar. 8, 2017 (Year: 2017).*

(Continued)

*Primary Examiner* — Phyllis A Book
(74) *Attorney, Agent, or Firm* — Wenderoth, Lind & Ponack, L.L.P.

(57) ABSTRACT

A system and method are provided for a network device for use with a client device having a hostname and a MAC address. The network device contains a memory that has a second hostname and a second MAC address stored within the memory. The second MAC address corresponds to the second hostname. The memory also contains a processor configured to execute instructions stored on the memory to cause the network device to: receive, from the client device, the hostname and the MAC address; determine whether the MAC address is randomized; provide an instruction to the client device to inform a user of the client device that the client device hostname is registered when the hostname matches the second hostname and the MAC address is randomized.

20 Claims, 11 Drawing Sheets

(51) Int. Cl.
*H04L 61/3015* (2022.01)
*H04L 61/4588* (2022.01)
*H04L 61/5076* (2022.01)
*H04L 101/622* (2022.01)

(56) References Cited

U.S. PATENT DOCUMENTS

| | | | | |
|---|---|---|---|---|
| 7,194,004 | B1* | 3/2007 | Thomsen | H04L 63/101 |
| | | | | 726/17 |
| 7,367,046 | B1* | 4/2008 | Sukiman | H04L 63/06 |
| | | | | 709/219 |
| 9,038,151 | B1* | 5/2015 | Chua | H04L 45/22 |
| | | | | 726/1 |
| 10,547,638 | B1* | 1/2020 | Li | H04L 61/4505 |
| 11,134,058 | B1* | 9/2021 | Sole | H04W 12/12 |
| 2008/0049779 | A1* | 2/2008 | Hopmann | H04L 41/26 |
| | | | | 370/431 |
| 2013/0191901 | A1* | 7/2013 | Black | H04L 63/0876 |
| | | | | 726/7 |
| 2016/0337426 | A1* | 11/2016 | Shribman | H04L 65/612 |
| 2017/0374034 | A1* | 12/2017 | Zuniga | H04L 63/0407 |
| 2018/0146001 | A1* | 5/2018 | Chien | H04L 63/0236 |
| 2018/0198828 | A1* | 7/2018 | Nakamoto | H04L 63/20 |
| 2018/0262388 | A1* | 9/2018 | Johnson | H04L 67/141 |
| 2018/0357422 | A1* | 12/2018 | Telang | G06F 21/577 |
| 2019/0081958 | A1* | 3/2019 | Lee | H04L 61/4511 |
| 2020/0322386 | A1* | 10/2020 | Mani | H04L 9/3234 |
| 2020/0344203 | A1* | 10/2020 | Mermoud | H04L 61/5014 |
| 2021/0067577 | A1* | 3/2021 | Shribman | G06F 16/955 |
| 2021/0234721 | A1* | 7/2021 | Shribman | G06F 16/955 |
| 2021/0345099 | A1* | 11/2021 | Raman | H04W 8/26 |

OTHER PUBLICATIONS

International Search Report and Written Opinion of the International Searching Authority dated Nov. 26, 2021, in International (PCT) Application No. PCT/US2021/045523.
Anonymous: "Solved: Parental controls over device with random MAC hardware addresses—Verizon Fios Community", Jul. 23, 2019, XP055862904, Retrieved from the Internet: https://forums.verizon.com/t5/Fios-lnternet/Parental-controls-over-device-with-random-MAC-hardware-addresses/td-p/883160.
Jeremy Martin et al., "A Study of MAC Address Randomization in Mobile Devices and When it Fails", arxiv.org, Cornell University Library, Mar. 8, 2017.
Huitema et al., "Anonymity Profiles for DHCP Clients; rfc7844.txt", IETF Standard, May 18, 2016, XP015112862.
Mark Hamilton (RUCKUS/COMMSCOPE): "Alternate edits to RCM TIG Report", IEEE Draft, Nov. 13, 2019, XP068164604.

* cited by examiner

| | | | | | |
|---|---|---|---|---|---|
| 02- | 32- | 62- | 92- | C2- | F2- |
| 06- | 36- | 66- | 96- | C6- | F6- |
| 0A- | 3A- | 6A- | 9A- | CA- | FA- |
| 0E- | 3E- | 6E- | 9E- | CE- | FE- |
| 12- | 42- | 72- | A2- | D2- | |
| 16- | 46- | 76- | A6- | D6- | |
| 1A- | 4A- | 7A- | AA- | DA- | |
| 1E- | 4E- | 7E- | AE- | DE- | |
| 22- | 52- | 82- | B2- | E2- | |
| 26- | 56- | 86- | B6- | E6- | |
| 2A- | 5A- | 8A- | BA- | EA- | |
| 2E- | 5E- | 8E- | BE- | EE- | |

Fig. 5C

CLIENT DEVICE BASED SOLUTION FOR HANDLING MAC RANDOMIZATION

BACKGROUND

Embodiments of the present disclosure relate to configuring a network to identify a mobile device when the mobile device has MAC randomization enabled.

SUMMARY

Aspects of the present disclosure are drawn to a network device for use with a client device having a hostname and a media access control (MAC) address. The network device contains a memory that has a second hostname and a second MAC address stored within the memory. The second MAC address corresponds to the second hostname. The memory also contains a processor configured to execute instructions stored on the memory to cause the network device to: receive, from the client device, the hostname and the MAC address; determine whether the MAC address is randomized; provide an instruction to the client device, to inform a user of the client device that the client device hostname is registered, when the hostname matches the second hostname and the MAC address is randomized.

In some embodiments, the processor is further configured to execute instructions stored on the memory to additionally cause the network device to permit the client device to have a second set of privileges with the network device when the hostname does not match the second hostname and when the MAC address is randomized.

In some embodiments, the processor is further configured to execute instructions stored on the memory to additionally cause the network device to: instruct the client device to prompt the user of the client device to confirm whether the client device is trusted when the hostname does not match the second hostname and when the MAC address is randomized; receive a non-trusted response signal from the client device indicating that the client device is not trusted; permit the client device to have the second set of privileges based on receipt of the non-trusted response signal; receive a trusted response signal from the client device indicating that the client device is trusted; and permit the client device to have a second set of privileges with the network device based on receipt of the trusted response signal.

In some embodiments, the processor is further configured to execute instructions stored on the memory to additionally cause the network device to determine whether the MAC address is randomized based on a second bit within a first octet of the MAC address.

In some embodiments, the processor is further configured to execute instructions stored on the memory to additionally cause the network device to determine whether the MAC address is randomized when the second bit within the first octet of the MAC address is a 1 and when the MAC address is a unicast address.

In some embodiments, the processor is further configured to execute instructions stored on the memory to additionally cause the network device to: permit the client device to have a first set of privileges with the network device when the hostname matches the second hostname and when the MAC address matches the second MAC address; and permit the client device to have the first set of privileges with the network device when the MAC address matches the second MAC address and when the MAC address is not randomized.

Other aspects of the present disclosure are drawn to a method of using a network device with a client device having a hostname and a MAC address. The method includes: receiving from the client device, via a processor configured to execute instructions stored on a memory having a second hostname and a second MAC address stored therein, the second MAC address corresponding to the second hostname, the hostname and the MAC address; determining, via the processor, whether the MAC address is randomized; and providing, via the processor, an instruction to the client device, to inform a user of the client device that the client device hostname is registered, when the hostname matches the second hostname and the MAC address is randomized.

In some embodiments, the method further includes permitting, via the processor, the client device to have a second set of privileges with the network device when the hostname does not match the second hostname and when the MAC address is randomized.

In some embodiments, the method further includes: instructing, via the processor, the client device to prompt the user of the client device to confirm whether the client device is trusted when the hostname does not match the second hostname and when the MAC address is randomized; receiving, via the processor, a non-trusted response signal from the client device indicating that the client device is not trusted; permitting, via the processor, the client device to have the second set of privileges based on receipt of the non-trusted response signal; receiving, via the processor, a trusted response signal from the client device indicating that the client device is trusted; and permitting, via the processor, the client device to have a second set of privileges with the network device based on receipt of the trusted response signal.

In some embodiments, the method to determine whether the MAC address is randomized includes determining whether the MAC address is randomized based on a second bit within a first octet of the MAC address.

In some embodiments, the method to determine whether the MAC address is randomized includes determining whether the MAC address is randomized when the second bit within the first octet of the MAC address is a 1 and when the MAC address is a unicast address.

In some embodiments, the method further includes: permitting, via the processor, the client device to have a first set of privileges with the network device when the hostname matches the second hostname and when the MAC address matches the second MAC address; and permitting, via the processor, the client device to have the first set of privileges with the network device when the MAC address matches the second MAC address and when the MAC address is not randomized.

Other aspects of the present disclosure are drawn to a non-transitory, computer-readable media having computer-readable instructions stored thereon, the computer-readable instructions being capable of being read by a network device for use with a client device having a hostname and a MAC address, wherein the computer-readable instructions are capable of instructing the network device to perform the method including: receiving from the client device, via a processor configured to execute instructions stored on a memory having a second hostname and a second MAC address stored therein, the second MAC address corresponding to the second hostname, the hostname and the MAC address; determining, via the processor, whether the MAC address is randomized; and providing, via the processor, an instruction to the client device, to inform a user of the client device that the client device hostname is registered, when the hostname matches the second hostname and the MAC address is randomized.

In some embodiments, the computer-readable instructions are capable of instructing the network device to perform the method further including permitting, via the processor, the client device to have a second set of privileges with the network device when the hostname does not match the second hostname and when the MAC address is randomized.

In some embodiments, the computer-readable instructions are capable of instructing the network device to perform the method further including: instructing, via the processor, the client device to prompt the user of the client device to confirm whether the client device is trusted when the hostname does not match the second hostname and when the MAC address is randomized; receiving, via the processor, a non-trusted response signal from the client device indicating that the client device is not trusted; permitting, via the processor, the client device to have the second set of privileges based on receipt of the non-trusted response signal; receiving, via the processor, a trusted response signal from the client device indicating that the client device is trusted; and permitting, via the processor, the client device to have a second set of privileges with the network device based on receipt of the trusted response signal.

In some embodiments, the computer-readable instructions are capable of instructing the network device to perform the method where determining whether the MAC address is randomized includes determining whether the MAC address is randomized based on a second bit within a first octet of the MAC address.

In some embodiments, the computer-readable instructions are capable of instructing the network device to perform the method where determining whether the MAC address is randomized includes determining whether the MAC address is randomized when the second bit within the first octet of the MAC address is a 1 and when the MAC address is a unicast address.

In some embodiments, the computer-readable instructions are capable of instructing the network device to perform the method further including: permitting, via the processor, the client device to have a first set of privileges with the network device when the hostname matches the second hostname and when the MAC address matches the second MAC address; and permitting, via the processor, the client device to have the first set of privileges with the network device when the MAC address matches the second MAC address and when the MAC address is not randomized.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 5B illustrates example randomized MAC addresses in hexadecimal format;

FIG. 5C illustrates first octet hexadecimal digit combinations for randomized MAC addresses.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

A MAC (Media Access Control) address is a 48-bit identification number that is assigned to the network interface card that resides in a piece of networking equipment. MAC addresses serve important purposes in networking. They are used as identification numbers for networking devices, and network switches use MAC addresses to decide how to forward traffic.

One issue with MAC addresses and wireless devices is that when a wireless device is sending out probe requests, its MAC address is included in the request and can be easily tracked. This feature has some benefits because some companies track customers and users by MAC address to provide custom user experiences on their wireless networks. But the ease of tracking MAC addresses also has raised privacy concerns for customers who do not want their movements and behaviors tracked.

As a solution to deal with the privacy concerns surrounding MAC address tracking, many device manufacturers are enabling MAC address randomization on their devices, and in many cases this feature is turned on by default. Oftentimes, customers do not even realize that their MAC addresses are being randomized. One downside to this is that for the networks and network device manufacturers that offer custom user experiences based on MAC addresses, they have found that these custom features no longer work when a user has MAC address randomization enabled.

For purposes of this discussion, consider a situation where a user of a client device wants to have access to a WLAN. For example, consider a situation where a person with a cell phone comes home after work and wants to connect to the Internet through their home Wi-Fi instead of through their cell phone service provider. This will now be described in greater detail with reference to FIGS. 1A-B.

Figure 1A:
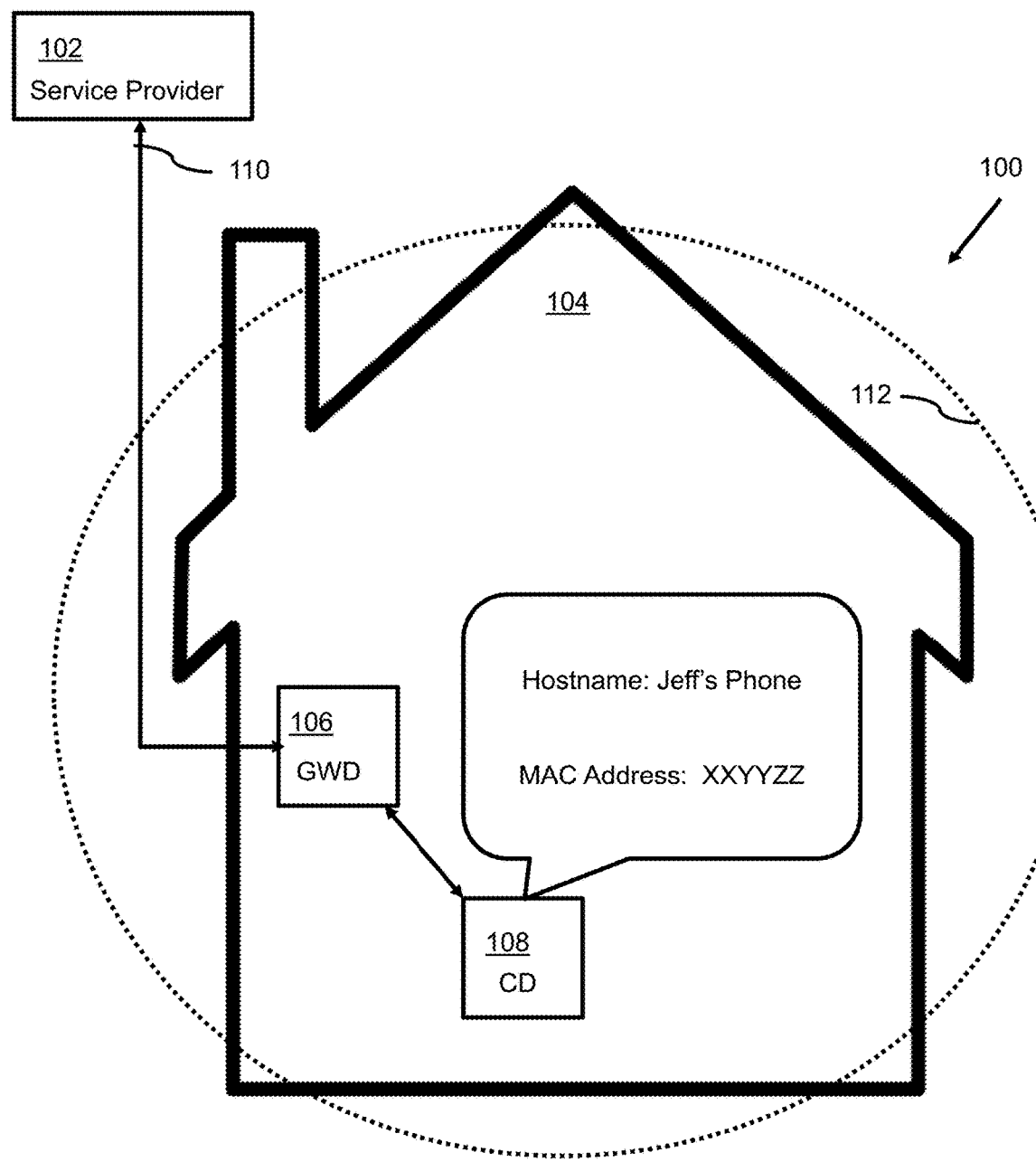
FIG. 1A illustrates a conventional communications network at a time $t_1$.

FIG. 1A illustrates a conventional network 100 at a time $t_1$.

As shown in FIG. 1, network 100 includes a service provider 102, physical media/wiring 110, and a residence 104. Residence 104 contains a gateway device 106, a client device 108, and a wireless local area network (WLAN) 112. Gateway device 106 is arranged to communicate with service provider 102 by way of physical/media wiring 110.

Gateway device 106, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 106 may be any device or system that is operable to allow data to flow from one discrete network to another, which in this example is from WLAN 112 in FIG. 1A to service provider 102. Gateway device 106 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 106 establishes, or is part of, WLAN 112, using Wi-Fi for example, such that client device 108 is able to communicate wirelessly with gateway device 106. In particular, gateway device 106 is able to communicate wirelessly directly with client device 108. The term Wi-Fi as used herein may be considered to refer to any of Wi-Fi 4, 5, 6, 6E, or any variation thereof.

Further, it should be noted that gateway device 106 is able to communicate with service provider 102 via physical media/wiring 110, which may optionally be a wireless communication system, such as 4G, or 5G, and further is able to connect to an external network, such as the Internet, via service provider 102.

Service provider 102 includes head-end equipment such as server computers (e.g., automatic configuration server ACS, cable modem termination system CMTS) that enable a content provider, such as a cable television provider, a satellite television provider, an Internet service provider, or multiple-systems operator (MSO), to provide content (such as audio/video content and/or Internet service) either through physical media/wiring 110, such as a coaxial network, an optical fiber network, and/or DSL, or WLAN 112, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOCSIS network, a fiber optics network (e.g., FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G, for example.

Gateway device 106 serves as a gateway or access point to an external network, e.g., the Internet (or otherwise as mentioned above), for one or more electronic devices, referred to generally herein as client device 108 and that wirelessly communicates with gateway device 106 via, e.g., Wi-Fi. Client device 108 can be a desktop computer, a laptop computer, an electronic tablet device, a smart phone, an appliance, or any other so-called Internet of Things equipped device that is equipped to communicate information via WLAN 112.

Within WLAN 112, electronic devices are often referred to as being stations. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 112, gateway device 106 is an access point for WLAN 112.

As shown in FIG. 1A, at time $t_1$, client device 108 has a hostname of Jeff's Phone and a MAC address of XXYYZZ. For purposes of discussion, assume that client device 108 has MAC randomization automatically enabled and that the MAC address for client device 108 changes every 24 hours.

When the user of client device 108 first connects to WLAN 112 through gateway device 106, the user customizes some of the settings on client device 108 such as parental controls. Gateway 106 makes a record of the custom settings of client device 108 and links those settings in its records to MAC address XXYYZZ. Every time the user of client device connects to WLAN 112 within a 24-hour period, the custom settings for client device 108 are activated.

In this example, because MAC address randomization is enabled for client device 108 and the MAC address changes every 24 hours, when 24 hours have expired, all of the custom settings for client device 108 based on the MAC address will revert back to their default settings. This will now be discussed with reference to FIG. 1B.

Figure 1B:
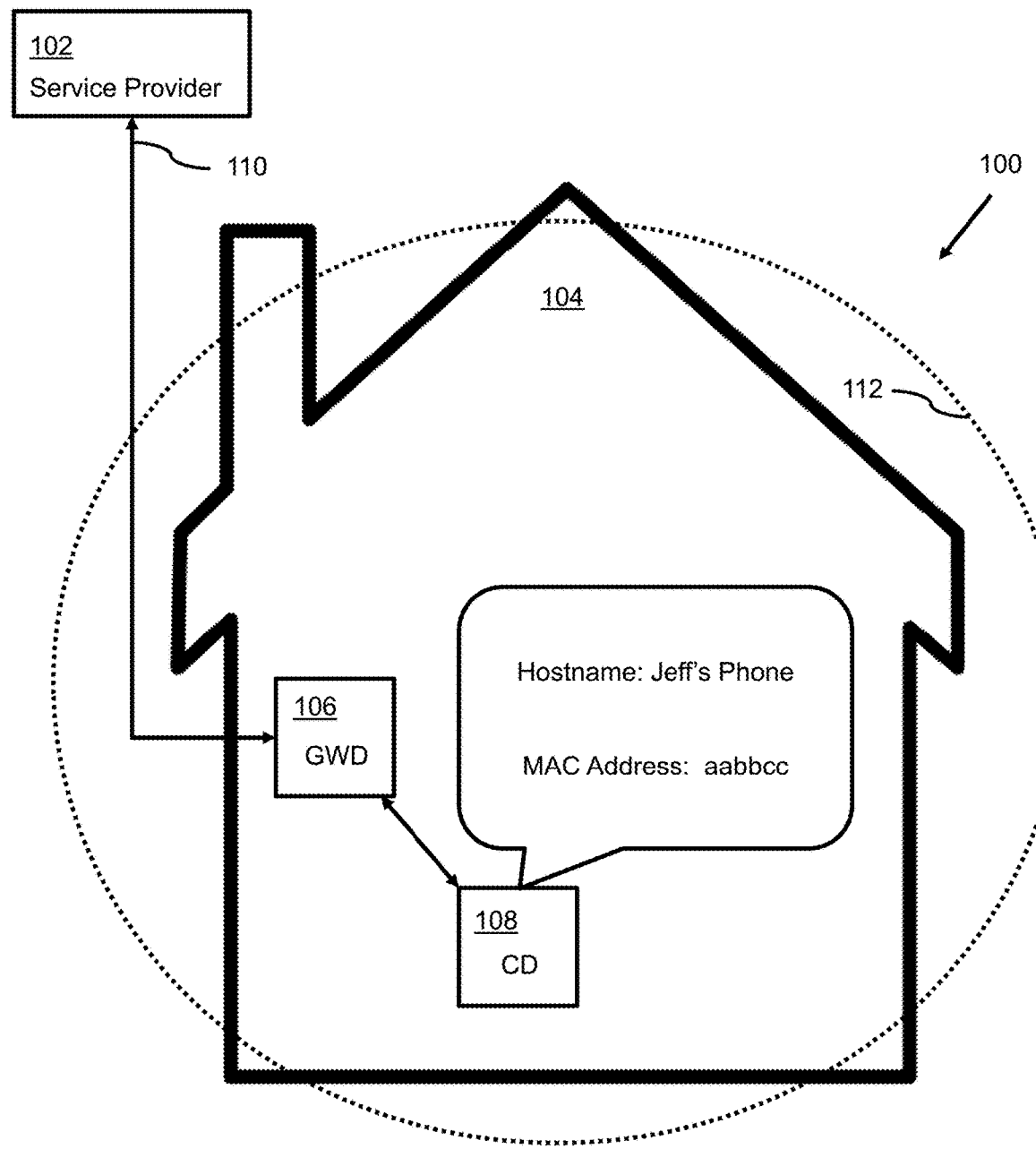
FIG. 1B illustrates the conventional communications network of FIG. TA at a time $t_2$.

FIG. 1B illustrates the conventional network of FIG. 1A at a time $t_2$.

As shown in FIG. 1B, at time $t_2$, client device 108 has a hostname of Jeff's Phone. In this example, time $t_2$ is 24 hours after time $t_1$, and because MAC randomization is enabled for client device 108, the MAC address for client device changes to aabbcc. When the user of client device 108 connects to WLAN 112 at time $t_2$, gateway device 106 does not enable the custom settings based on the MAC address of client device 108 because it cannot find MAC address aabbcc in its records. As a result, on client device 108, all of the custom settings that were based on the previous MAC address for client device 108 are no longer available. Depending on what those custom settings were, this situation could lead to a very frustrating experience for the user of client device 108.

What is needed is a system and method for customizing the settings and features for a client device on a wireless network when the client device has MAC address randomization enabled.

A system and method in accordance with the present disclosure solves the problem of not being able to customize the settings and features for a client device on a wireless network when the client device is using a randomized MAC address.

In accordance with the present disclosure, when a client device attempts to join a wireless network, a check is performed to see if the MAC address of the client device is known to the network. If the MAC address of the client device is known to the network, another check is performed to see if the hostname of the client device is known to the network. If both the MAC address of the client device and the hostname of the client device are known to the network, the client device is allowed onto the network as a trusted device, and all the rules and settings for that device are applied to the device.

If the MAC address of the client device is known to the network but the hostname of the client device is not known to the network, the user is asked if the device should be trusted. If the user affirms that the device should be trusted, then the network records are updated with the hostname of the client device, and the client device is allowed onto the network as a trusted device, and all the rules and settings for that device are applied to the device.

If the MAC address of the client device is not known to the network, a check is performed to see if the MAC address of the client device is randomized. If the MAC address of the client device is not randomized, the client device is set as a new device on the network and is identified on the network using its manufacturer assigned MAC address.

If the MAC address of the client device is randomized, the user is asked if the device should be trusted. If the user indicates that the device should not be trusted, the client device is denied access to the network. If the user affirms that the device should be trusted then the user is asked to either keep the default hostname or select a new hostname for the device. The hostname that the user selects is tested to make sure that it is not empty or in use by another client device on the network. If the hostname is empty or in use by another client device on the network, the user is asked to select another hostname. If the user decides not to select another hostname, the client device is denied access to the network. If the user selects another hostname, the hostname is checked again to make sure that it is not empty or in use by another client device that is online. Once the user selects a hostname for the client device that is not in use by another client device that is online, the client device is allowed onto the network as a trusted device, and all the rules and settings for that device are applied to the device.

This invention provides an improved experience on a wireless network for a user with a client device that uses randomized MAC addresses. By connecting the user's experience on the network to the hostname of the client device, which will not change, instead of to randomized MAC addresses, which do change, the network will be able to remember the client device on the network and provide custom settings for the user of the client device every time the client device joins the network.

An example system and method for determining if the MAC address of a client device is randomized and for updating the network records for a client device with the hostname of the client device in accordance with aspects of the present disclosure will now be described in greater detail with reference to FIGS. 2-6B.

Figure 2A:
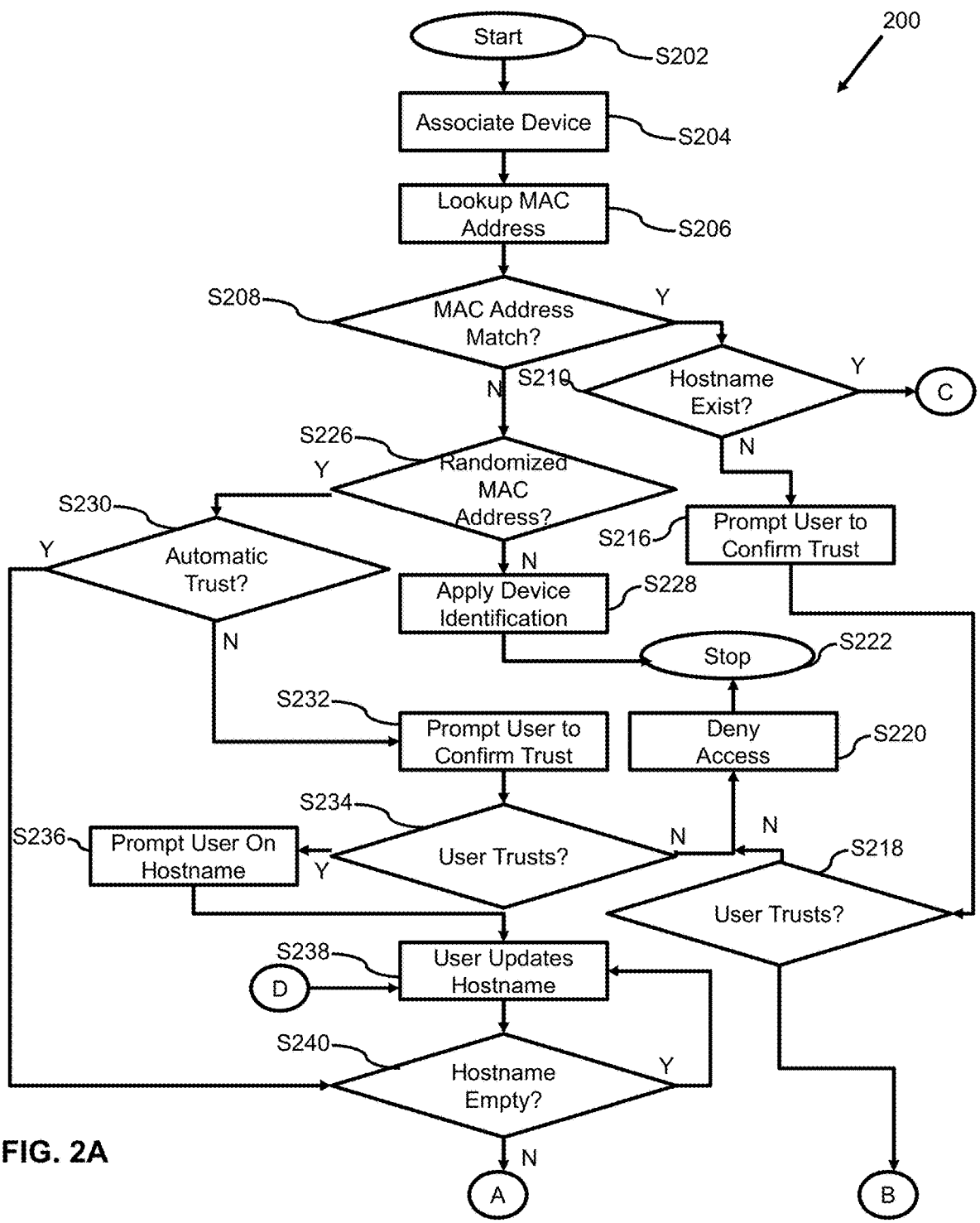
FIG. 2A illustrates a first portion of an example algorithm in accordance with aspects of the present disclosure.
Figure 2B:
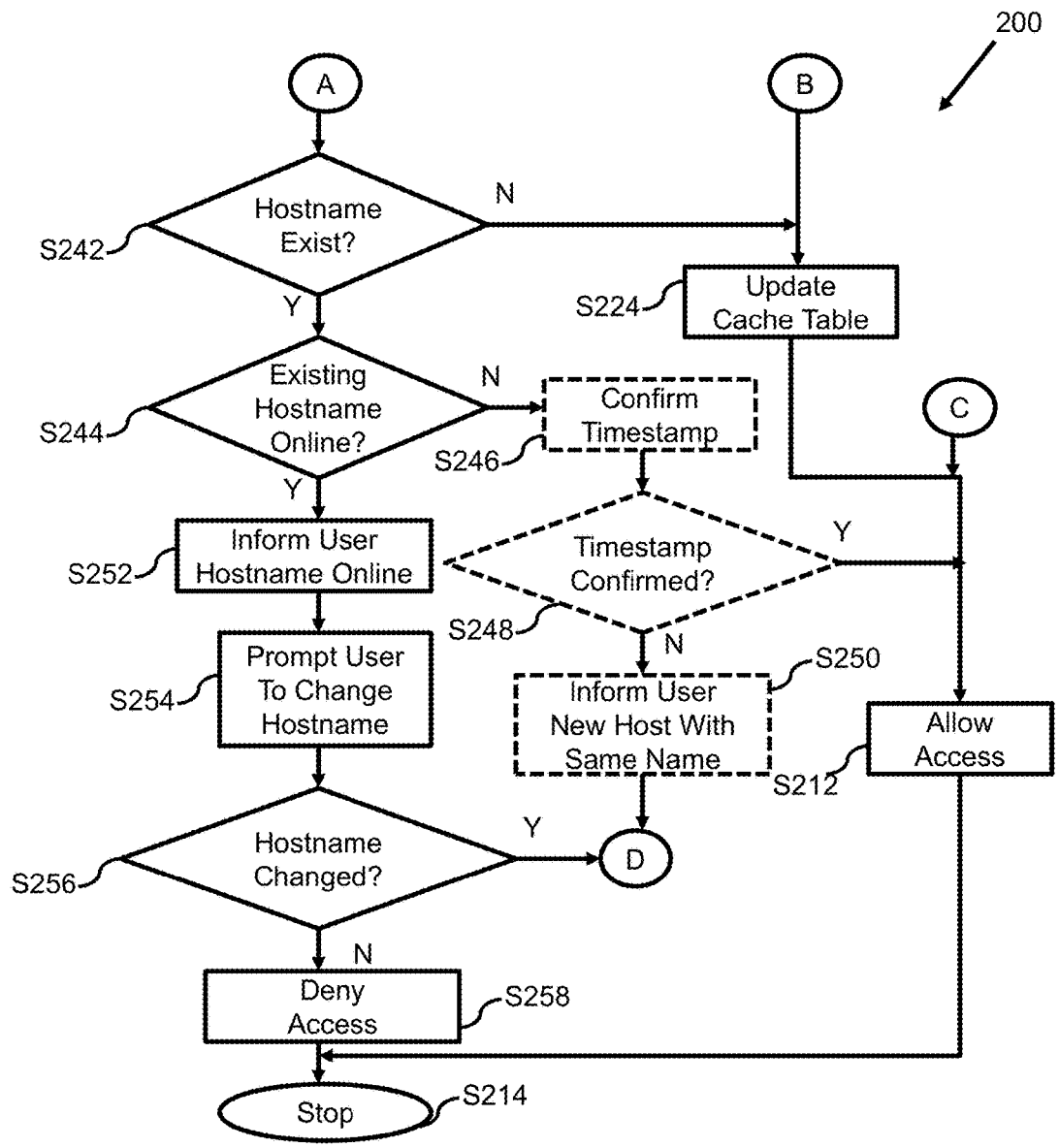
FIG. 2B illustrates a second portion of the example algorithm of FIG. 2A.

FIGS. 2A-B illustrate an example an algorithm 200 in accordance with aspects of the present disclosure. Algorithm 200 determines if the MAC address of a client device is randomized and also updates the network records with the hostname of the client device. This will be described in more detail with reference to FIGS. 3-6B.

Figure 3A:
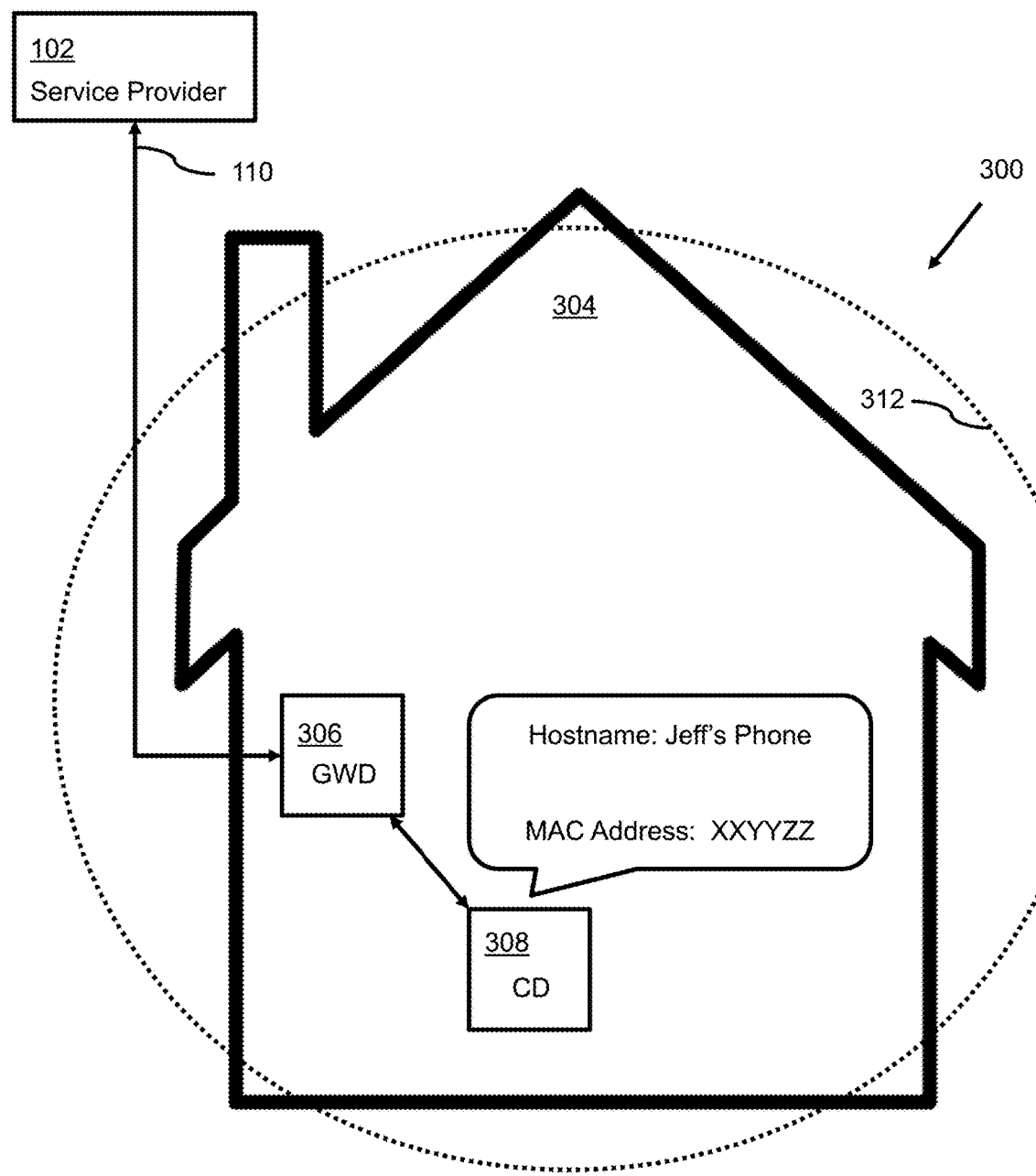
FIG. 3A illustrates a communications network at a time $t_3$ in accordance with aspects of the present disclosure.

FIG. 3A illustrates a network 300 at a time $t_3$ in accordance with aspects of the present disclosure.

As shown in FIG. 3A, network 300 includes service provider 102, physical media/wiring 110, and a residence 304. Residence 304 contains a gateway device 306, a client device 308, and a WLAN 312. Gateway device 306 is arranged to communicate with service provider 102 by way of physical/media wiring 110.

In operation, at time $t_3$, the user of client device 308 is connected to WLAN 312 through gateway device 306. At time $t_3$, client device 308 has a hostname of Jeff's Phone and a MAC address of XXYYZZ.

Figure 3B:
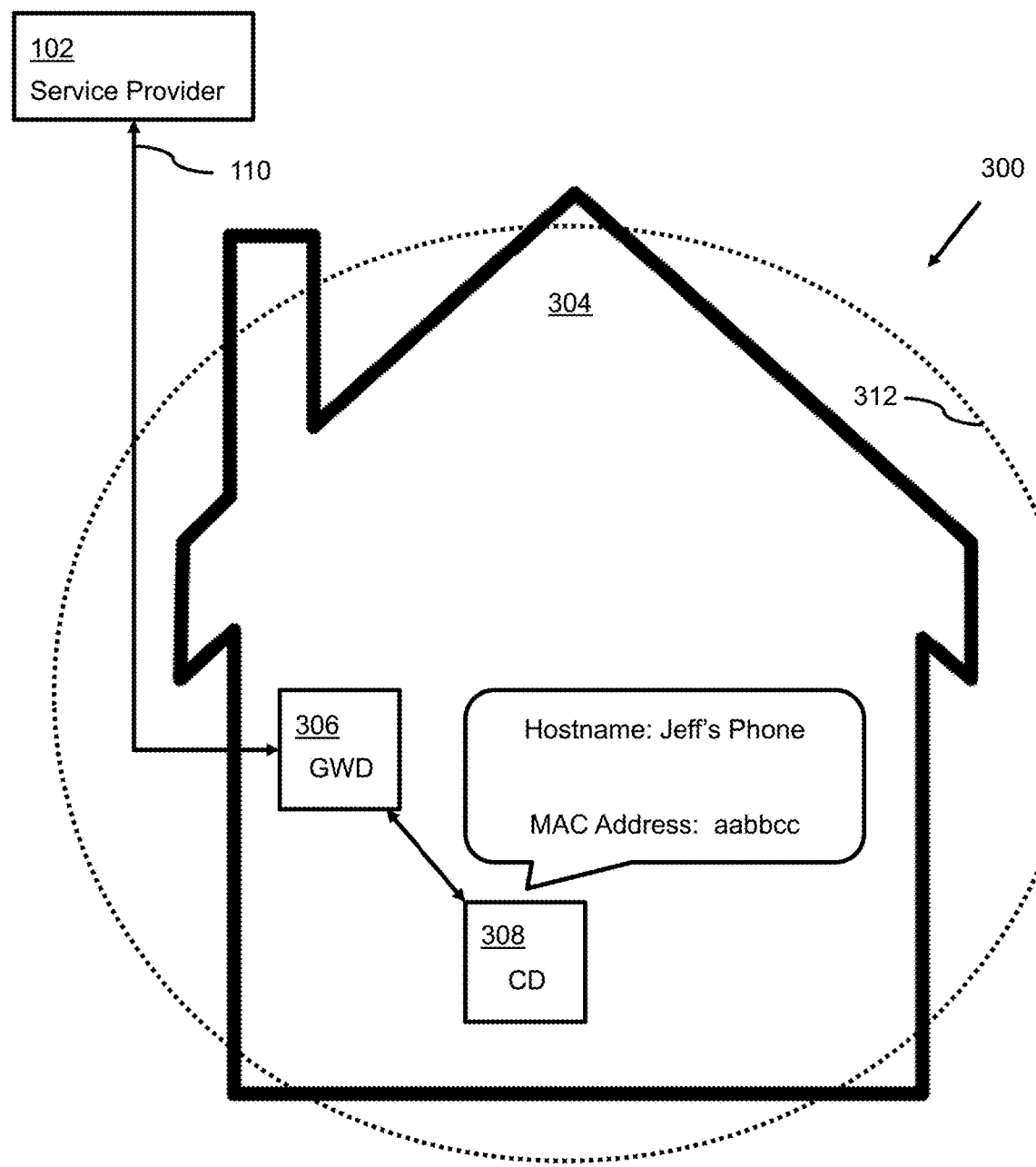
FIG. 3B illustrates the network of FIG. 3A at a time $t_4$.

FIG. 3B illustrates the network of FIG. 3A at a time $t_4$. In operation, at time $t_4$, the user of client device 308 is connected to WLAN 312 through gateway device 306. At time $t_4$, client device 308 has a hostname of Jeff's Phone and a MAC address of aabbcc.

Figure 3C:
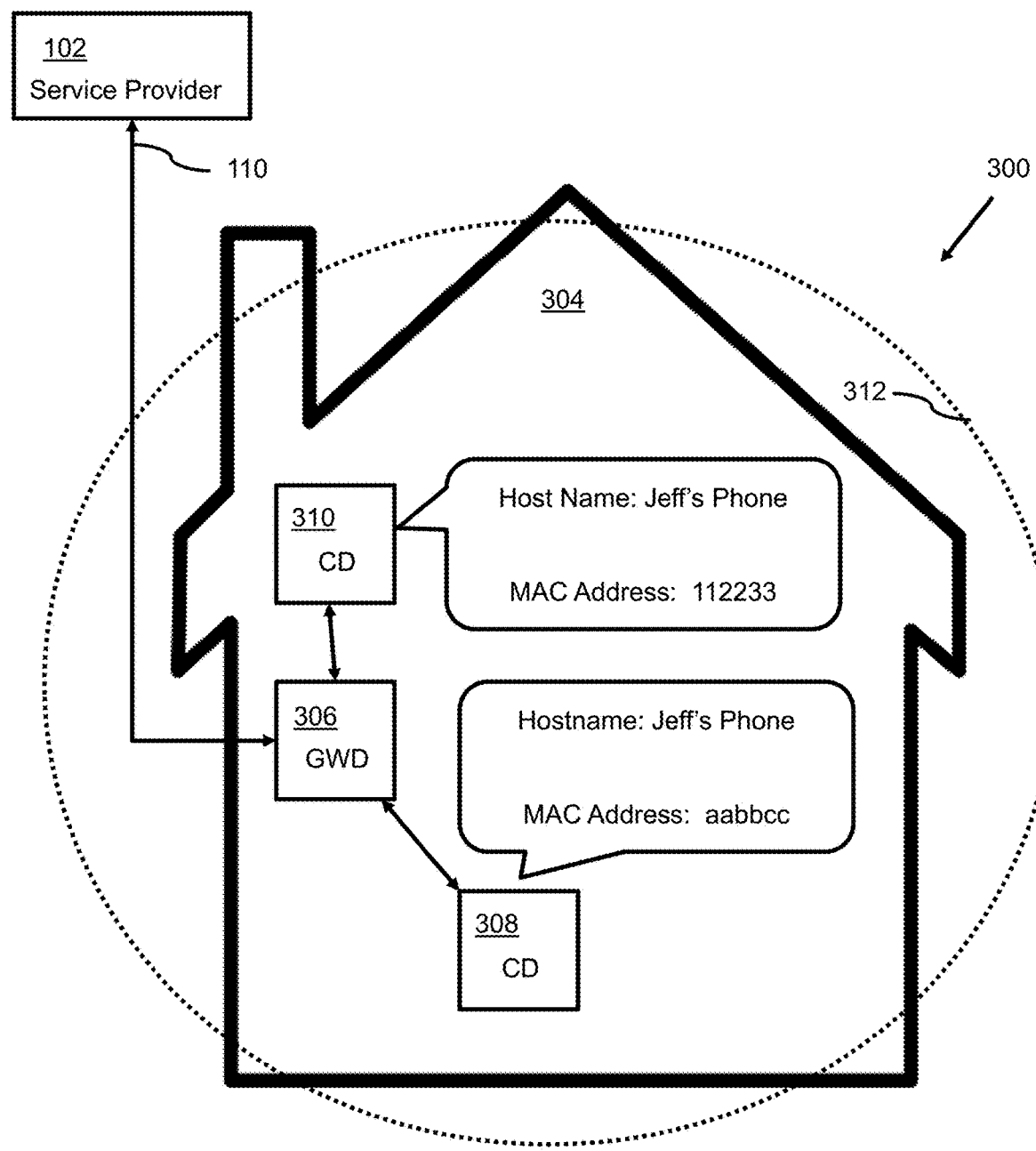
FIG. 3C further illustrates the network of FIG. 3A at a time $t_5$.

FIG. 3C further illustrates the network of FIG. 3A at a time $t_5$ with the addition of client device 310. In operation, at time $t_5$, the user of client device 308 is connected to WLAN 312 through gateway device 306. At time $t_5$, client device 308 has a hostname of Jeff's Phone and a MAC address of aabbcc. The user of client device 310 is attempting to connect to WLAN 312. At time $t_5$, client device 310 has a hostname of Jeff's Phone and a MAC address of 112233.

Figure 4:
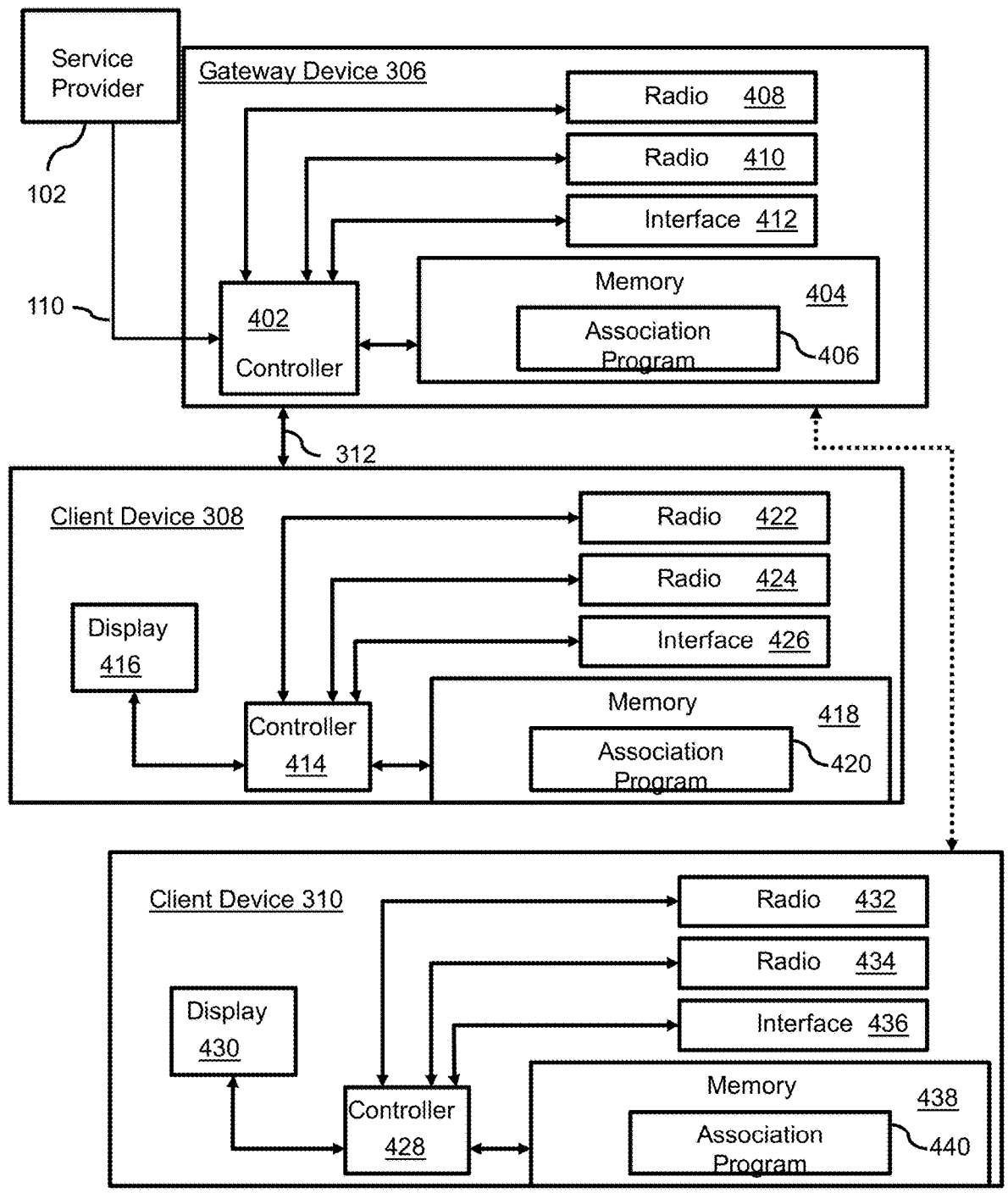
FIG. 4 illustrates an exploded view of a gateway device and a registered client device and an onboarding client device in accordance with aspects of the present disclosure.

FIG. 4 illustrates an exploded view of gateway device 306, client device 308 and client device 310 of FIG. 3C.

As shown in FIG. 4, gateway device 306 includes a controller 402, a radio 408, a radio 410, an interface circuit 412, and a memory 404, which has stored therein an association program 406.

In this example, controller 402, memory 404, radio 408, radio 410, and interface circuit 412 are illustrated as individual devices. However, in some embodiments, at least two of controller 402, memory 404, radio 408, radio 410, and interface circuit 412 may be combined as a unitary device. Whether as individual devices or as combined devices, controller 402, memory 404, radio 408, radio 410, and interface circuit 412 may be implemented as any combination of an apparatus, a system and an integrated circuit. Further, in some embodiments, at least one of controller 402, memory 404 and interface circuit 412 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 402 is a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 306 in accordance with the embodiments described in the present disclosure.

Memory 404 can store various programming, and user content, and data including association program 406. In some embodiments, as will be described in more detail below, memory 404 has a hostname and a MAC address stored therein, wherein the MAC address corresponds to the hostname and association program 406 has instructions therein, that when executed by controller 402 enable gateway device 306 to: receive, from client device 308, the hostname and the MAC address of client device 308; determine whether the MAC address of client device is randomized; and provide an instruction to client device 308 to inform a user of client device 308 that the hostname of client device 308 is registered, when the hostname of client device 308 matches the hostname in memory 404 and the MAC address of client device 308 is randomized.

In some embodiments, as will be described in greater detail below, association program 406 has additional instructions therein, that when executed by controller 402 enable gateway device 306 to permit client device 308 to have a second set of privileges with network gateway device 306 when the hostname of client device 308 does not match the hostname in memory 404 and when the MAC address of client device 308 is randomized.

In some embodiments, as will be described in greater detail below, association program 406 has additional instructions therein, that when executed by controller 402 enable gateway device 306 to: instruct client device 308 to prompt the user of client device 308 to confirm whether client device is trusted when the hostname of client device 308 does not match the hostname in memory 404 and when the MAC address of client device 308 is randomized; receive a non-trusted response signal from client device 308 indicating that client device 308 is not trusted; permit client device 308 to have the second set of privileges based on receipt of the non-trusted response signal; receive a trusted response signal from client device 308 indicating that client device 308 is trusted; and permit client device 308 to have a second set of privileges with gateway device 306 based on receipt of the trusted response signal.

In some embodiments, as will be described in greater detail below, association program 406 has additional instructions therein, that when executed by controller 402 enable gateway device 306 to determine whether the MAC address of client device 308 is randomized based on a second bit within a first octet of the MAC address of client device 308. In some of these embodiments, as will be described in greater detail below, association program 406 has additional instructions therein, that when executed by controller 402 enable gateway device 306 to determine whether the MAC address of client device 308 is randomized when the second bit within the first octet of the MAC address of client device 308 is a 1 and when the MAC address of client device 308 is a unicast address.

In some embodiments, as will be described in greater detail below, association program 406 has additional instructions therein, that when executed by controller 402 enable gateway device 306 to permit client device 308 to have a first set of privileges with gateway device 306 when the hostname of client device 308 matches the hostname in memory 404 and when the MAC address of client device 308 matches the MAC address in memory 404; and permit client device 308 to have the first set of privileges with gateway device 306 when the MAC address of client device 308 matches the MAC address in memory 404 and when the MAC address of client device 308 is not randomized.

Interface circuit 412 can include one or more connectors, such as RF connectors, or Ethernet connectors, and/or wireless communication circuitry, such as 5G circuitry and one or more antennas. Interface circuit 412 receives content from service provider 102 (as shown in FIG. 4) by known methods, non-limiting examples of which include terrestrial antenna, satellite dish, wired cable, DSL, optical fibers, or 5G as discussed above. Through interface circuit 412, gateway device 306 receives an input signal, including data and/or audio/video content, from service provider 102 and can send data to service provider 102.

Radio 408, radio 410 (and preferably additional radios), may also be referred to as a wireless communication circuit, such as a Wi-Fi WLAN interface radio transceiver and are operable to communicate with client device 308. Radio 408 and radio 410 each include one or more antennas and communicate wirelessly via one or more of the 2.4 GHz band, the 5 GHz band, the 6 GHz band, and the 60 GHz band or at the appropriate band and bandwidth to implement any IEEE 802.11 Wi-Fi protocols, such as the Wi-Fi 4, 5, 6, or 6E protocols. Gateway device 306 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or the 60 GHz bands, RF4CE protocol, ZigBee protocol, Z-Wave protocol, or IEEE 802.15.4 protocol.

Client device 308 includes a controller 414, a radio 422, a radio 424, an interface circuit 426, a memory 418 which has stored therein an association program 420, and a display 416.

In this example, controller 414, memory 418, radio 422, radio 424, interface circuit 426, and display 416 are illustrated as individual devices. However, in some embodiments, at least two of controller 414, main memory 418, radio 422, radio 424, interface circuit 426, and display 416 may be combined as a unitary device. Further, in some embodiments, at least one of controller 414 and memory 418 may be implemented as a computer having tangible computer-readable media for carrying or having computer-executable instructions or data structures stored thereon.

Controller 414, which can include hardware circuitry such as a dedicated control circuit, CPU, microprocessor, etc., controls the circuits of client device 308.

Memory 418 can store various programming, and user content, and data including association program 420. As will be described in greater detail below, association program 420 includes instructions, that when executed by controller 414, enable client device 308 to associated with gateway device 306. Memory 418 additionally includes the hostname of client device 308 and the MAC address of client device 308, which in some embodiments may be a randomized MAC address.

Radio 422 and radio 424 each may include a Wi-Fi WLAN interface radio transceiver that is operable to communicate with gateway device 306, as shown in FIGS. 3A-C, and also may include a cellular transceiver operable to communicate with service provider 102 through wireless network 312. Radio 422 and radio 424 each include one or more antennas and communicate wirelessly via one or more of the 2.4 GHz band, the 5 GHz band, the 6 GHz band, and the 60 GHz band or at the appropriate band and bandwidth to implement any IEEE 802.11 Wi-Fi protocols, such as the Wi-Fi 4, 5, 6, or 6E protocols. Client device 308 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or the 60 GHz bands, RF4CE protocol, ZigBee protocol, Z-Wave protocol, or IEEE 802.15.4 protocol.

Client device 310 includes a controller 428, a radio 432, a radio 434, an interface circuit 436, a memory 438 which has stored therein an association program 440, and a display 430.

In this example, controller 434, memory 438, radio 432, radio 434, interface circuit 436, and display 430 are illustrated as individual devices. However, in some embodiments, at least two of controller 434, main memory 438, radio 432, radio 434, interface circuit 436, and display 440 may be combined as a unitary device. Further, in some embodiments, at least one of controller 434 and memory 438 may be implemented as a computer having tangible computer-readable media for carrying or having computer-executable instructions or data structures stored thereon.

Controller 428, which can include hardware circuitry such as a dedicated control circuit, CPU, microprocessor, etc., controls the circuits of client device 310.

Memory 438 can store various programming, and user content, and data including association program 440. As will be described in greater detail below, association program 440 includes instructions, that when executed by controller 428, enable client device 310 to associated with gateway device 306. Memory 438 additionally includes the hostname of client device 310 and the MAC address of client device 310, which in some embodiments may be a randomized MAC address.

Radio 432 and radio 434 each may include a Wi-Fi WLAN interface radio transceiver that is operable to communicate with gateway device 306, as shown in FIG. 3C, and also may include a cellular transceiver operable to communicate with service provider 102 through wireless network 312. Radio 432 and radio 434 each include one or more antennas and communicate wirelessly via one or more of the 2.4 GHz band, the 5 GHz band, the 6 GHz band, and the 60 GHz band or at the appropriate band and bandwidth to implement any IEEE 802.11 Wi-Fi protocols, such as the Wi-Fi 4, 5, 6, or 6E protocols. Client device 308 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6

GHz bands, or the 60 GHz bands, RF4CE protocol, ZigBee protocol, Z-Wave protocol, or IEEE 802.15.4 protocol.

Any other client device within WLAN 312 may be a client device similar to client device 308. In the event that a client device within WLAN 312 is not a client device similar to client device 308, such a client device may still include: a controller, which can include a dedicated hardware circuitry such as a dedicated control circuit, CPU, microprocessor, etc., and that controls the circuits of the client device; a memory, which has stored therein an association program, that is similar to memory 418 and association program 420, respectively, of client device 308 discussed above; one or more radios similar to radio 422 and/or radio 424 of client device 308 discussed above; in additional to further functional circuitry. Accordingly, any of the client devices may include a Wi-Fi WLAN interface radio transceiver that is configured to communicate with other client devices, with Wi-Fi extenders, and with gateway device 306, as shown in FIGS. 3A-C. Further, any of the client devices may be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol, in a manner similar to client device 308 discussed above.

Insofar as gateway device 306 provides a connection to service provider 102, such as an MSO, gateway device 306 can be equipped with connectors to connect with a television or display device, and can also include programming to execute an electronic program guide and/or other suitable graphical user interface (GUI), and can with such configuration be referred to as a so-called set top box. Such a set top box can be included in the system shown in FIGS. 3A-C as gateway device 306 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

Figure 5A:
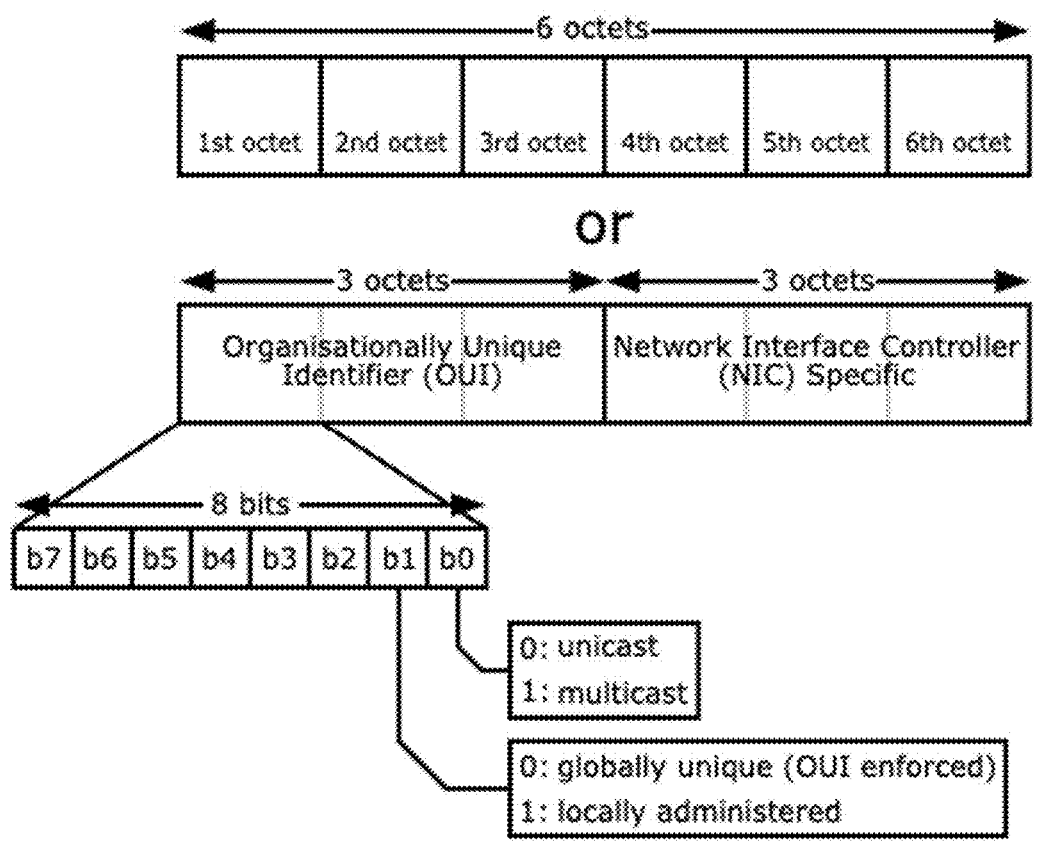
FIG. 5A illustrates the structure of a MAC address.

FIG. 5A illustrates the structure of a MAC address. A MAC address is composed of six octets. The first three octets compose the Organizationally Unique Identifier (OUI), or the number that identifies a vendor, manufacturer, or organization. The last three octets, designated as Network Interface Controller (NIC) specific, are assigned by the owner of the OUI to the device itself.

The first octet of a MAC address can be used to determine if a MAC address is randomized or not. For purposes of discussion, as shown in FIG. 5A, let the bits within an octet be numbered from b0 to b7 with b0 being the least significant digit and b7 being the most significant digit. If b0 is 0, the MAC address is a unicast address. If b0 is 0 and b1 is 1, the MAC address for a device is also a randomized MAC address. This will now be discussed further with reference to FIG. 5B.

FIG. 5B illustrates example randomized MAC addresses in hexadecimal format. For example, the first MAC address shown in FIG. 5B is 32-28-6D-51-13-AF. The two hexadecimal digits forming the first octet are 32. The hexadecimal digits 32, when converted to binary format, are 0011 0010. In the binary format of the hexadecimal number 32, b0 is equal to 0 and b1 is equal to 1. Therefore, the MAC address 32-28-6D-51-13-AF is a randomized MAC address.

As another example, consider the MAC address 56-EF-68-F6-0D-30 in FIG. 5B. The two hexadecimal digits forming the first octet are 56. The hexadecimal digits 56, when converted to binary format, are 0101 0110. In the binary format of the hexadecimal number 56, b0 is equal to 0 and b1 is equal to 1. Therefore, the MAC address 56-EF-68-F6-0D-30 is a randomized MAC address.

As a third example, consider the MAC address 0A-13-A8-8E-B5-EF in FIG. 5B. The two hexadecimal digits forming the first octet are 0A. The hexadecimal digits 0A, when converted to binary format, are 0000 1010. In the binary format of the hexadecimal number 0A, b0 is equal to 0 and b1 is equal to 1. Therefore, the MAC address 0A-13-A8-8E-B5-EF is a randomized MAC address.

As a fourth example, consider the MAC address AE-83-37-55-A7-22. If the hexadecimal number forming the first octet, AE, is converted to binary format, the result is 1010 1110. In the binary format of the hexadecimal number AE, b0 is equal to 0 and b1 is equal to 1. Therefore, the MAC address AE-83-37-55-A7-22 is a randomized MAC address.

FIG. 5C illustrates first octet hexadecimal digit combinations for randomized MAC addresses. As shown in FIG. 5C, any MAC address with a first octet that ends in 2, 6, A, or E is a randomized MAC address.

Figure 6A:
FIGS. 6A-B illustrate two client device user interfaces in accordance with aspects of the present disclosure.
Figure 6B:
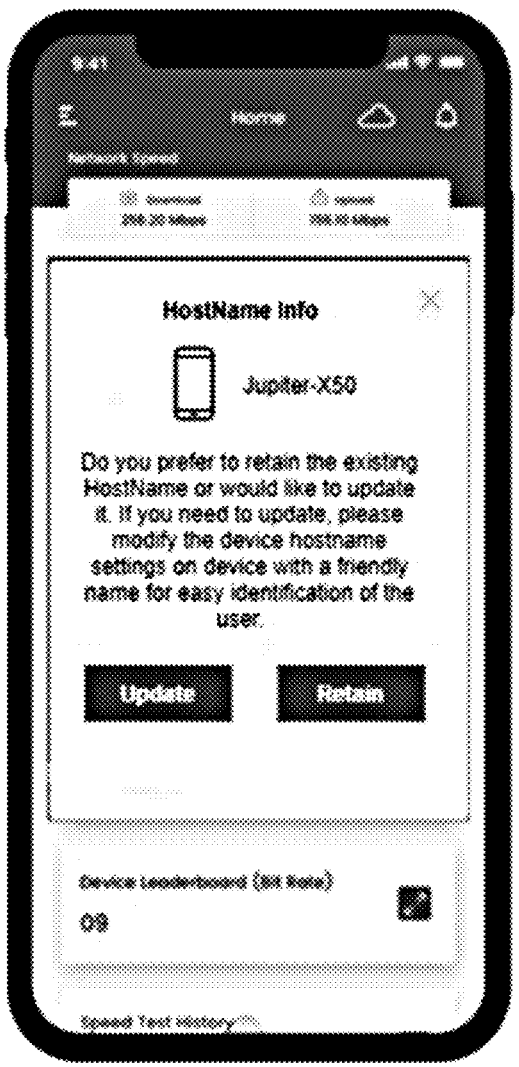

FIGS. 6A-B illustrate two client device user interfaces that show an example of a text message requesting that a client device be allowed to join a network and an example of a text message prompting a user to choose a hostname for their device that has joined the network. FIG. 6A is an example of the type of message that would be presented to a user when a new device is attempting to join the network. FIG. 6B is an example of the type of message that would be presented to the user of a client device that has joined a network and needs to change the hostname of the device.

Returning to FIG. 2A, as shown in the figure, algorithm 200 to be executed by a processor starts (S202) and a device is associated (S204). For example, returning to FIG. 3A, client device 308 associates with gateway device 306. In some embodiments, controller 414 instructs at least one of radio 422 and radio 424 to broadcast a request to connect to gateway device 306, where a corresponding one of radio 408 or radio 410 of gateway device 306 will receive the request. Upon receiving the request from client device 308, controller 402 of gateway device 306 will instruct the receiving radio, either radio 408 or radio 410 to initiate complete an associating handshake with client device 308 to complete association of client device 308 onto gateway device 306.

It should be noted that memory 404 of gateway device includes a cache table that includes a hostname, a list of MAC addresses associated to this hostname and a last association timestamp (e.g., time, day, date) for each client device that has associated with gateway device 306. This cache table is updated each time a client device associates with gateway device 306.

Returning to FIG. 2A, after the device is associated (S204), the MAC address of the device is searched (S206). For example, as shown in FIG. 4, controller 402 of gateway device 306 may instructed the communicating radio, either radio 408 or radio 410, to send a MAC address request to client device 308. Upon receiving the MAC address request, controller 414 of client device 308 may obtain the MAC address of client device 308 from memory 418. Controller 414 may then instruct the communicating radio, either radio 408 or radio 410, to transmit the MAC address of client device 308 to gateway device 306. Upon receiving the MAC address of client device 308, controller 402 may search memory 404 for a matching MAC address.

Returning to FIG. 2A, after the MAC address is searched (S206), it is determined whether or not the MAC address of the client device is known on the network (S208). For example, returning to FIG. 3A, when client device 308 first attempts to join WLAN 312, gateway device 306 checks to see if it has a record of the MAC address of client device 308, which, in this case, is XXYYZZ.

Returning to FIG. 2A, if it is determined that the MAC address of the client device is known on the network (Y at S208), it is determined if the hostname of the client device is known on the network (S210). For example, returning to FIG. 3A, if gateway device 306 has a record of the MAC address of client device 308, then gateway device 306 checks to see if it also has a record of the hostname of client device 308, which in this case, is Jeff's Phone.

Returning to FIG. 2A, if it is determined that the hostname of the client device is known on the network (Y at S210), then the client device is allowed onto the network as a trusted device and all the rules for a client device to be on the network are applied to the client device (S212). For example, returning to FIG. 3A, if gateway device 306 has a record of the hostname of client device 308, which is Jeff's Phone, then client device 308 is allowed onto WLAN 312 as a trusted device, and all the rules or custom settings for client device 308 are activated.

As shown in FIG. 2B, after the client device is allowed onto the network (S212), algorithm 200 stops (S214). If it is determined that the hostname of the client device is not known on the network (N at S210), a user of gateway device is prompted to confirm trust in the client device (S216). For example, as shown in FIG. 4, controller 402 of client device prompts a user of gateway device, as to whether the user trusts client device 308 to have access onto WLAN 312.

Returning to FIG. 2A, after the user it prompted to confirm trust in the client device (S216), then it is determined whether or not the client device should be trusted (S218). For example, returning to FIG. 3B, if gateway device 306 does not have a record of the hostname Jeff's Phone that is associated with client device 308, then a message appears on client device 308 asking the user if client device 308 should be trusted. For example, returning to FIG. 6A, a message like the one shown in the image of the app on the client device of FIG. 6A would be presented to the user to enable the user to either deny or allow access to the network.

Returning to FIG. 2A, if it is determined that the client device should not be trusted (N at S218), then the client device is denied access to the network (S220). For example, returning to FIG. 3B, if the user of client device 308 determines that client device 308 should not be trusted, then client device 308 is denied access to WLAN 312. For example, returning to FIG. 6A, after the user is presented the message on the app of the client device, if the user selects "Deny" on the app, the client device would be denied access to the network.

Returning to FIG. 2A, if the client device is denied access to the network (S220), algorithm 200 stops (S222). For example, returning to FIG. 3B, if client device 308 is denied access to WLAN 312, the algorithm ends. For example, returning to FIG. 6A, if "Deny" is selected in the app on the client device, the algorithm ends.

Returning to FIG. 2A, if it is determined that the client device should be trusted (Y at S218), then the network records are updated with the hostname of the client device (S224). For example, returning to FIG. 3B, if the user of client device 308 determines that client device 308 should be trusted, then gateway device 306 updates a cache table within memory 404 for client device 308 with the hostname of client device 308.

As shown in FIG. 2B, after the network records are updated with the hostname of the client device (S224), then the client device is allowed onto the network as a trusted device and all the rules for a client device to be on the network are applied to the client device (S212). For example, returning to FIG. 3B, after gateway device 306 updates its records to include the hostname of client device 308, then client device 308 is allowed onto WLAN 312 as a trusted device, and all of the rules and settings that were previously established for client device 308 on WLAN 312 based on its original MAC address are now activated for client device 308.

Returning to FIG. 2B, after the client device is allowed onto the network (S212), algorithm 200 stops (S214). However, if it is determined that the MAC address of the client device is not known on the network (N at S208), it is determined if the MAC address of the client device is randomized (S226). Returning to FIG. 3C, as previously mentioned, at time $t_5$, client device 310 is attempting join WLAN 312. Client device 310 has a hostname of Jeff's Phone and a MAC address of 112233. If gateway device 306 does not have a record of MAC address 112233 in its records, gateway device 306 determines if MAC address 112233 is randomized. For example, returning to FIG. 5A, gateway device 306 examines the first octet of MAC address 112233 in binary format to determine if b0 is 0 and b1 is 1.

Returning to FIG. 2A, If it is determined that the MAC address of the client device is not randomized (N at S226), the client device is set as a new device on the network and the device is identified on the network based on its manufacturer assigned MAC address (S228). For example, returning to FIG. 3C, if gateway device 306 determines that the MAC address of client 310, which is 112233, is not randomized, for example, returning to FIG. 5A, if within the first octet of MAC address 112233, when converted to binary format, b0 is not 0 and b1 is not 1, then, returning to FIG. 3C, client device 310 is set as a new device on WLAN 312, and client device 310 is identified on WLAN 312 by its MAC address, 112233.

Returning to FIG. 2A, after the device is identified on the network based on its manufacturer assigned MAC address (S228), algorithm 200 stops (S222). For example, returning to FIG. 3C, after client device 310 is identified on WLAN 312 by its MAC address, 112233, the algorithm ends.

Returning to FIG. 2A, if it is determined that the MAC address of the client device is randomized (Y at S226), it is determined whether the client device is configured to be automatically trusted (S230). For example, as shown in FIG. 4, in some embodiments, association program 420 may include instructions that when read by controller 414 cause controller 414 to automatically trust client device 308 to connect to WLAN 312.

Returning to FIG. 2A, if it is determined that the client device is not configured to be automatically trusted (N at S230), then the user of gateway device is prompted to confirm trust in the client device (S232). This operation may be performed in a manner similar to that discussed above (S216). It is then determined whether or not the client device should be trusted (S234). Returning to FIG. 3C, if it is determined that the MAC address of client device 310 is randomized, for example, returning to FIG. 5A, if within the first octet of MAC address 112233, when converted to binary format, b0 is 0 and b1 is 1, then, returning to FIG. 3C, the user of client device 310 determines if client device 310 should be trusted. For example, returning to FIG. 6A, a message like the one shown in the image of the app on the client device of FIG. 6A would be presented to the user to enable the user to either deny or allow access to the network.

Returning to FIG. 2A, if it is determined that the client device should not be trusted (N at S234), then the client device is denied access to the network (S220) and algorithm 200 stops (S222). Alternatively, if it is determined that the client device should be trusted (Y at S234), then the user of gateway device 306 is prompted to either keep the default hostname or select a new hostname for the client device (S236). For example, returning to FIG. 3C, if the user of gateway device 306 determines that client device 310 should be trusted, then the user of gateway device 306 is prompted to either keep the default hostname or select a new hostname for client device 310. For example, returning to FIG. 6B, a message like the one shown in the image of the app on the client device of FIG. 6B would be presented to the user of gateway device to enable the user of gateway device to either keep the default hostname or select a new hostname for the client device.

Returning to FIG. 2A, after the user of the gateway device decides to either keep the default hostname or select a new hostname for the client device (S236), the user updates the hostname in the client device (S238). For example, returning to FIG. 3C, after the user of gateway device 306 decides to either keep the default hostname or select a new hostname for client device 310, the user updates the hostname in client device 310.

Returning to FIG. 2A, after the user updates the hostname of the client device (S238), it is determined if the hostname in the client device is empty (S240). For example, returning to FIG. 3C, after the user of gateway device 306 updates the hostname in client device 310, a determination is made as to whether or not the hostname in client device 310 is empty.

Returning to FIG. 2A, if it is determined that the hostname in the client device is empty (Y at S240), the user is prompted to select a new hostname for the client device (return to S236). For example, returning to FIG. 3C, if it is determined that the hostname for client device 310 is empty, the user of gateway device 306 is prompted to either keep the default hostname or select a new hostname for client device 310. For example, returning to FIG. 6B, a message like the one shown in the image of the app on the client device of FIG. 6B would be presented to the user of gateway device 306 to enable the user to either keep the default hostname or select a new hostname for the client device.

Returning to FIG. 2A, if it is determined that the hostname in the client device is not empty (N at S240), it is determined if the hostname exists on the network (S242). For example, returning to FIG. 3C, if it is determined that the hostname for client device 310 is not empty, gateway device 306 examines its records to see if the hostname selected for client device 310 already exists.

As shown in FIG. 2B, if it is determined that the hostname exists on the network (Y at S242), it is determined if the hostname is in use by another client device that is online (S244). For example, returning to FIG. 3C, if gateway 306 determines that the hostname selected for client device 310 already exists in its records, it is determined if the hostname selected for client device 310 is in use by another client device that is online.

Returning to FIG. 2B, if it is determined that the hostname does not exist on the network (N at S242), then the network records are updated with the hostname of the client device (return to S224). Further, if it is determined that the hostname exists on the network (Y at S244), then a timestamp is confirmed (S246). For example, returning to FIG. 4, memory 404 of gateway device 306 may include a cache table of associations for client device 308 with gateway device 306, wherein the cache table will include a timestamp of the most recent association of client device 308. Similarly, memory 418 of client device 308 will additionally include a log of associations for client device 308 with gateway device 306, wherein the cache table will include a timestamp of the most recent association of client device 308. If the timestamp within memory 404 of gateway device 306 matches the timestamp within memory 418 of client device 308, then the timestamp is confirmed to be authentic. However, if the timestamp within memory 404 of gateway device 306 does not match the timestamp within memory 418 of client device 308, or if a timestamp is missing from one of memory 404 of gateway device 306 or memory 418 of client device 308, then the timestamp will not be confirmed to be authentic.

Returning to FIG. 2B, if the timestamp is confirmed (Y at S248) then the client device is allowed access to WLAN 312 (S212). Alternatively, if the timestamp is not confirmed (N at S248), then the user of gateway device 306 is alerted that their client device may be a new host with the same name as another host and user is prompted to select an alternate hostname (S250). For example, returning to FIG. 3C, if the last time client device 310 was online cannot be confirmed by gateway 306, the user of gateway device 306 is alerted that client device 310 may be a new host with the same name as another host on WLAN 312. The user of gateway device 306 is prompted to select an alternate hostname for client device 310.

Returning to FIG. 2B, after the user is prompted to select an alternate hostname (S250), the hostname is updated (return to S238). However if it is determined the hostname is in use by another client device that is online (Y at S244), the user of gateway device is alerted that the hostname is already in use online and the user is provided the option to select another hostname (S252). For example, returning to FIG. 3C, if gateway device 306 determines that the hostname selected for client device 310 is already in use by client device 308, which is online, then the user of gateway device 306 is presented with the option to select another hostname.

Returning to FIG. 2B, after the user is alerted that the hostname is already in use online and the user is provided the option to select another hostname (S252), the user is prompted to change the hostname (S254). For example, as shown in FIG. 4, controller 402 may prompt for the user of gateway device to change the hostname of client device 308.

Returning to FIG. 2B, after the user is prompted to change the hostname, it is determined whether the hostname has been changed (S256). For example, returning to FIG. 3C, after the user of gateway device 306 is alerted that the hostname selected for client device 310 is already in use by client device 308, which is online, and the user of gateway device 306 is provided the option to select another hostname, the user of gateway device 306 decides whether or not to select another hostname for client device 310.

Returning to FIG. 2B, if another hostname is selected (Y at S256), the user updates the hostname for the client device (return to S238). Alternatively, if the user of gateway device 306 decides not to select another hostname (N at S256), the client device is denied access to the network (S258). For example, returning to FIG. 3C, if the user of gateway device 306 decides not to select another hostname for client device 310, client device 310 is denied access to WLAN 312.

Returning to FIG. 2B, after the user is denied access to the network (S258), algorithm 200 stops (S214).

In the non-limiting example embodiments discussed above, if the client device is not trusted, then the gateway device (or more generally the network device controlling access to the network) denies access to the network. However in some embodiments, if the client device is not trusted, then the gateway device may permit the client device to have a predetermined set of privileges that are less than the privileges of another client device that is trusted. For example, an untrusted client device may be permitted access to the Internet, but not permitted access to other network devices within the network, whereas a trusted client device may be permitted access to the Internet and permitted access to other network devices within the network.

In the non-limiting example embodiments discussed above, if the client device is not trusted, then the gateway device (or more generally the network device controlling access to the network) denies access to the network. However in some embodiments, such determinations of trust and the operations associated with the determinations of trust are performed by a client device that is already registered with the gateway device. For example, algorithm 200 discussed above may be performed by controller 414 of client device 308 in an instance where client device 310 is attempting to gain access to gateway device 306. In such embodiments, client device 308 may access the cache table of gateway device 306, as discussed above, which is updated each time a client device associates with gateway device 306.

MAC addresses are identification numbers assigned to every piece of equipment on a network. Because MAC addresses are included in probe requests when a wireless device is searching for a network to join, MAC addresses can be used to track wireless devices and their users. This aspect of wireless networking has raised many privacy concerns, and as a result, many device manufacturers are configuring their devices to use randomized MAC addresses when sending out probe requests. For network service providers and network equipment manufacturers that have relied on the actual, unchanging MAC address of a device to provide their customers with customized user experiences, MAC address randomization has hindered them from providing their customers with the personalized experiences they are accustomed to.

A system and a method in accordance with the present disclosure provides an algorithm that checks to see if a client device that is connecting to a network is using randomized MAC addresses. If the client device is using randomized MAC addresses, the algorithm uses the hostname of the client device to identify the client device on the network. The benefit of this invention is that it provides a simple way for network service providers and network equipment manufacturers to continue to offer their customers a personalized user experience when the client device is using randomized MAC addresses.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A network device for use a client device having a hostname and a MAC address, said network device comprising:
a memory having a second hostname and a second MAC address stored therein, the second MAC address corresponding to the second hostname; and
a processor configured to execute instructions stored on said memory to cause said network device to:
receive, from the client device, the hostname and the MAC address;
determine whether the MAC address is randomized; and
provide an instruction to the client device, to inform a user of the client device that the client device hostname is registered, when the hostname matches the second hostname and the MAC address is randomized.

2. The network device of claim 1, wherein the processor is further configured to execute instructions stored on said memory to additionally cause said network device to permit the client device to have a second set of privileges with said network device when the hostname does not match the second hostname and when the MAC address is randomized.

3. The network device of claim 1, wherein the processor is further configured to execute instructions stored on said memory to additionally cause said network device to:
instruct the client device to prompt the user of the client device to confirm whether the client device is trusted when the hostname does not match the second hostname and when the MAC address is randomized;
receive a non-trusted response signal from the client device indicating that the client device is not trusted;
permit the client device to have the second set of privileges based on receipt of the non-trusted response signal;
receive a trusted response signal from the client device indicating that the client device is trusted; and
permit the client device to have a second set of privileges with said network device based on receipt of the trusted response signal.

4. The network device of claim 1, wherein the processor is further configured to execute instructions stored on said memory to additionally cause said network device to determine whether the MAC address is randomized based on a second bit within a first octet of the MAC address.

5. The network device of claim 4, wherein the processor is further configured to execute instructions stored on said memory to additionally cause said network device to determine whether the MAC address is randomized when the second bit within the first octet of the MAC address is a 1 and when the MAC address is a unicast address.

6. The network device of claim 1, wherein the processor is further configured to execute instructions stored on said memory to additionally cause said network device to:
permit the client device to have a first set of privileges with said network device when the hostname matches the second hostname and when the MAC address matches the second MAC address; and permit the client device to have the first set of privileges with said network device when the MAC address matches the second MAC address and when the MAC address is not randomized.

7. A method of using a network device with a client device having a hostname and a MAC address, said method comprising:
receiving from the client device, via a processor configured to execute instructions stored on a memory having a second hostname and a second MAC address stored therein, the second MAC address corresponding to the second hostname, the hostname and the MAC address;
determining, via the processor, whether the MAC address is randomized; and
providing, via the processor, an instruction to the client device, to inform a user of the client device that the client device hostname is registered, when the hostname matches the second hostname and the MAC address is randomized.

8. The method of claim 7, further comprising permitting, via the processor, the client device to have a second set of privileges with said network device when the hostname does not match the second hostname and when the MAC address is randomized.

9. The method of claim 8, further comprising:
instructing, via the processor, the client device to prompt the user of the client device to confirm whether the client device is trusted when the hostname does not match the second hostname and when the MAC address is randomized;
receiving, via the processor, a non-trusted response signal from the client device indicating that the client device is not trusted;
permitting, via the processor, the client device to have the second set of privileges based on receipt of the non-trusted response signal;
receiving, via the processor, a trusted response signal from the client device indicating that the client device is trusted; and
permitting, via the processor, the client device to have a second set of privileges with the network device based on receipt of the trusted response signal.

10. The method of claim 7, wherein said determining whether the MAC address is randomized comprises determining whether the MAC address is randomized based on a second bit within a first octet of the MAC address.

11. The method of claim 7, wherein said determining whether the MAC address is randomized comprises determining whether the MAC address is randomized when the second bit within the first octet of the MAC address is a 1 and when the MAC address is a unicast address.

12. The method of claim 11, further comprising:
permitting, via the processor, the client device to have a first set of privileges with said network device when the hostname matches the second hostname and when the MAC address matches the second MAC address; and
permitting, via the processor, the client device to have the first set of privileges with said network device when the MAC address matches the second MAC address and when the MAC address is not randomized.

13. A non-transitory, computer-readable media having computer-readable instructions stored thereon, the computer-readable instructions being capable of being read by a network device for use with a client device having a hostname and a MAC address, wherein the computer-readable instructions are capable of instructing the network device to perform the method comprising:
receiving from the client device, via a processor configured to execute instructions stored on a memory having a second hostname and a second MAC address stored therein, the second MAC address corresponding to the second hostname, the hostname and the MAC address;
determining, via the processor, whether the MAC address is randomized; and
providing, via the processor, an instruction to the client device, to inform a user of the client device that the client device hostname is registered, when the hostname matches the second hostname and the MAC address is randomized.

14. The non-transitory, computer-readable media of claim 13, wherein the computer-readable instructions are capable of instructing the network device to perform the method further comprising permitting, via the processor, the client device to have a second set of privileges with said network device when the hostname does not match the second hostname and when the MAC address is randomized.

15. The non-transitory, computer-readable media of claim 14, wherein the computer-readable instructions are capable of instructing the network device to perform the method further comprising:
instructing, via the processor, the client device to prompt the user of the client device to confirm whether the client device is trusted when the hostname does not match the second hostname and when the MAC address is randomized;
receiving, via the processor, a non-trusted response signal from the client device indicating that the client device is not trusted;
permitting, via the processor, the client device to have the second set of privileges based on receipt of the non-trusted response signal;
receiving, via the processor, a trusted response signal from the client device indicating that the client device is trusted; and
permitting, via the processor, the client device to have a second set of privileges with the network device based on receipt of the trusted response signal.

16. The non-transitory, computer-readable media of claim 13, wherein the computer-readable instructions are capable of instructing the network device to perform the method wherein said determining whether the MAC address is randomized comprises determining whether the MAC address is randomized based on a second bit within a first octet of the MAC address.

17. The non-transitory, computer-readable media of claim 16, wherein the computer-readable instructions are capable of instructing the network device to perform the method wherein said determining whether the MAC address is randomized comprises determining whether the MAC address is randomized when the second bit within the first octet of the MAC address is a 1 and when the MAC address is a unicast address.

18. The non-transitory, computer-readable media of claim 13, wherein the computer-readable instructions are capable of instructing the network device to perform the method further comprising:
permitting, via the processor, the client device to have a first set of privileges with said network device when the hostname matches the second hostname and when the MAC address matches the second MAC address; and
permitting, via the processor, the client device to have the first set of privileges with said network device when the MAC address matches the second MAC address and when the MAC address is not randomized.

19. The non-transitory, computer-readable media of claim 13, wherein the computer-readable instructions are capable of instructing the network device to perform the method further comprising:
    determining, via the processor, whether another client device having the hostname is currently associated with said network device;
    informing, via the processor, a user of the client device that the another client device has the hostname and is currently associated with the network device; and
    prompting, via the processor, the user to change the hostname of the client device.

20. The non-transitory, computer-readable media of claim 13, wherein the computer-readable instructions are capable of instructing the network device to perform the method further comprising:
    determining, via the processor, whether another client device having the hostname is currently associated with said network device;
    confirming, via the processor, a timestamp of the client device, and
    wherein the timestamp corresponds to a time what the client device associated with the network device.

* * * * *